No. 808,594. PATENTED DEC. 26, 1905.
A. ARTOM.
APPARATUS FOR THE TRANSMISSION OF ENERGY THROUGH SPACE.
APPLICATION FILED FEB. 20, 1905.
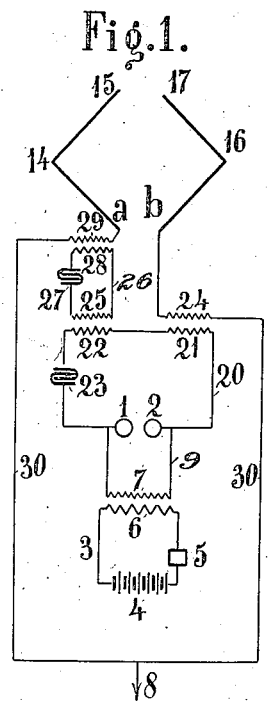
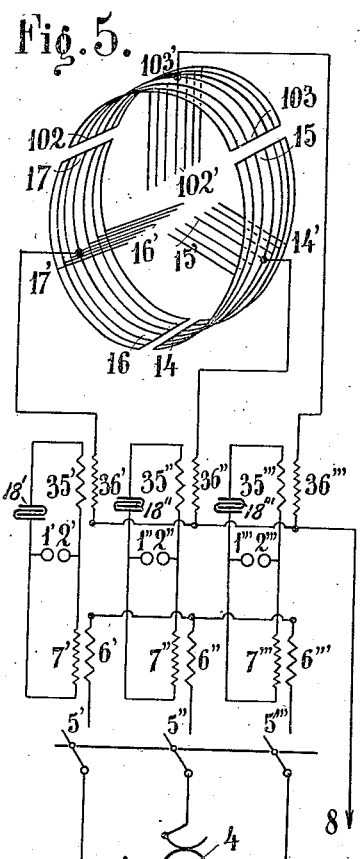
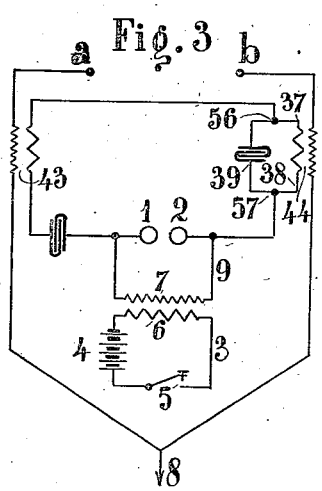
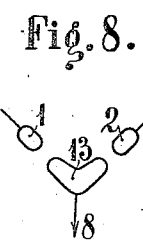
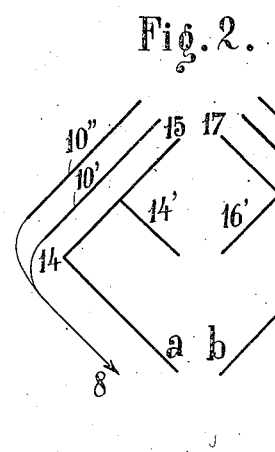
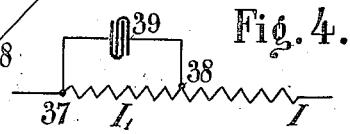
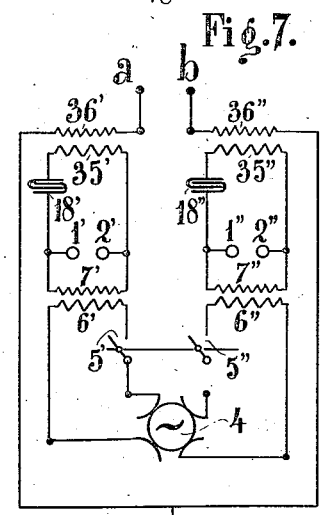
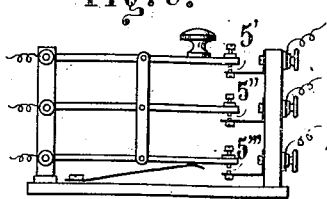
Witnesses:
Inventor:
Alessandro Artom,

UNITED STATES PATENT OFFICE.

ALESSANDRO ARTOM, OF TURIN, ITALY.

APPARATUS FOR THE TRANSMISSION OF ENERGY THROUGH SPACE.

No. 808,594.      Specification of Letters Patent.      Patented Dec. 26, 1905.

Application filed February 20, 1905. Serial No. 246,627.

*To all whom it may concern:*

Be it known that I, ALESSANDRO ARTOM, a subject of the King of Italy, residing at Turin, Italy, have invented certain new and useful Improvements in Apparatus for the Transmission of Energy Through Space, of which the following is a specification.

This invention relates to apparatus for the transmission of electrical energy across space and more particularly to that class of apparatus for wireless telegraphy.

The apparatus which form the subject of the present invention are designed to be employed with circularly or elliptically polarized electromagnetic waves for transmitting and receiving telegraphic signals, as disclosed in my United States Patent No. 770,668.

The apparatus for electric signaling is represented in the accompanying drawings, in which Figure 1 is a diagrammatic view illustrating the transmitting-station. Fig. 2 is a modified form of the aerials of Fig. 1. Fig. 3 shows a modified form of the transmitting-station without the aerial conductors. Fig. 4 is a scheme of the manner in which the phase displacement between the two currents takes place in the apparatus of Fig. 3. Fig. 5 is a diagrammatic view illustrating a transmitting-station in which a three-phase current is used. Fig. 6 is a detailed view of the transmitting-key. Fig. 7 is a view similar to Fig. 5, in which a two-phase current is used. Fig. 8 shows a modified form of the oscillator.

In the form of transmitting apparatus shown in Fig. 1, 3 is the circuit in which are inserted in series a battery 4, a suitable interrupter 5 and the primary coil 6 of an inductorium. Through the primary coil 6 and by means of the secondary coil 7 is produced in the secondary circuit 9 of the induction apparatus an induction-current feeding the discharge-conductors 1, 2 and producing a discharge between them. From the discharge-conductors is branched off a circuit 20, in which are inserted the primary induction-coils 21 and 22 and a suitable condenser 23. The primary coil 21 inserted in the circuit 20 transmits the electrical oscillations through a secondary coil 24 to a first aerial conductor connected at $b$. The primary coil 22 also inserted in the circuit 20 transmits in its turn the electric oscillations to a secondary coil 25 belonging to a circuit 26, to which belongs also a means for phase displacement (condenser 27 or the like) and a primary coil 28. This latter transmits the electric oscillations through a secondary coil 29 to a second aerial conductor connected at the point $a$, which is symmetrical with and of the same type as the first aerial. The terminals of the coils 24 and 29 are connected with a wire 30, which is grounded at 8.

The oscillations arriving at the aerial connected at $b$ are in normal conditions, that is they are not displaced of phase; on the contrary the oscillations reaching the other aerial connected at $a$ are displaced of phase (in this case of one-fourth of period) in respect of the first oscillations. Both oscillations being displaced of phase one to the other and meeting on the aerials at an angle, will be composed in a polarized rotating radiation.

In combination with the aerial conductors, which, as stated in my prior patent, may be constituted by grids or lattice-work, I use (Fig. 2) one or more couples of especial screens constituted by grids of conducting-wires 10′ 11′, 10″ 11″ disposed at the back of the grids of the main aerials, these screen-grids being insulated or not from the earth. By means of this arrangement and owing to the proximity of the radiations from the aerials, induced currents are produced on the wires of the screens and these induced currents produce electric and magnetic forces which cause the production of a rotatory radiation of the same direction as that produced by the main aerials. These couples of screens serve for diminishing the width of the cone of the transmitted waves.

In Fig. 3 is illustrated a transmitting-station, in which the production of two oscillations having the same period and amplitude but displaced of phase of one-fourth of period is founded on the following fact admitted in electrotechnics. In a circuit traversed by an alternate current (Fig. 4) it is possible to cause the portion 37.38 of the circuit to be passed by a current $I_1$ of intensity equal to the intensity $I$ of the current passing in the circuit but displaced of phase in respect of the same of one-fourth of period. This is obtained by inserting in derivation a condenser 39 of capacity $$C = \frac{1}{4\pi^2 n^2 L},$$

$n$ representing the frequency of the oscillations and L the coefficient of self-induction of the portion 37.38 of the circuit. Moreover there must also exist the relation $2\pi nL = r$. The experiments have demonstrated that it is easy to obtain in the practice the conditions imposed by the theory. According to the above-enunciated fact the oscillatory discharge which takes place between the two discharge-conductors 1, 2 pass through the primary circuit of the transformer 43 and is transmitted by induction to the secondary having a terminal $a$ upon one of the aerial conductors while the other terminal is grounded. The oscillatory current arriving at the points 56, 57 is separated in two parts. In the portion of the circuit 37.38 constituting the primary of the oscillation-transformer 44, the oscillatory current is by means of the condenser 39 displaced of phase of one-fourth of period; this in accordance with the above-enunciated fact of electrotechnics. Said oscillatory current is transmitted by induction to the secondary winding of the transformer 44, a terminal of said winding being connected at $b$ with the other aerial conductor, while the other terminal is grounded at 8. The two systems of aerial conductors will therefore be traversed by two oscillatory currents of the same period and frequency but displaced of phase of ninety degrees or other suitable angle and producing circular or elliptical oscillations.

Fig. 5 shows diagrammatically a further arrangement for obtaining the same purpose that is the production of circularly or elliptically polarized electromagnetic waves, by using three-phase current. Therefore a three-phase alternator 4 is used as source of electricity. In the three circuits of the alternator may be inserted by means of the coupled interrupters 5' 5" 5"', illustrated in detailed view in Fig. 6, three primary circuits 6' 6" 6"' of three induction-coils. A capacity 18' and a primary winding 35' are inserted at the terminals of the secondary winding 7' of one of the coils and form with it a circuit. The primary winding 35' has a few turns and constitutes the primary of one of the oscillation-transformers that are wound upon wooden cores; the oscillator constituted by the two spheres 1' 2' is inserted in derivation. The secondaries 7" 7"', the capacities 18", 18"', the primary spirals 35", 35"' of the oscillation-transformers and the oscillators constituted by the spheres 1", 2" and 1"', 2"' are inserted on the other phases in similar manner as described for the first phase. The three secondary windings 36', 36", 36"' of the oscillation-transformers are respectively connected by a terminal to the pieces 16.17, 14.15, 102.103 constituting the system of aerial conductors. The free terminals of said secondary windings are connected together and grounded at 8. The mast or aerial conductors are three 14.15, 16.17, 102.103, suitably insulated one from another and forming together a cylindrical surface. They are constituted of grids or lattice-work of conducting-wires, these being arranged in planes parallel one to another and likewise parallel with the cylinder-bases. At the middle line of each of these three pieces (having cylindrical surface and an angular width of about one hundred and twenty degrees) are disposed the three plane projections 14'.15', 17'.16', 102'.103' in radial planes of the said cylindrical surface and therefore at one hundred and twenty degrees one to another. These projections are constituted of grids or lattice-work of wires insulated one from another and connected by an extremity to the wires of the main grids or lattice-work, while the other extremity may be supported by any suitable means, but in any case kept insulated. Within this cylindrical surface the electric and magnetic forces of the three oscillations (which are displaced of phase of one hundred and twenty degrees) are composed and cause the production of the circular or elliptical oscillations, which radiate for the greatest part in the direction of the cylinder-axis.

In the transmitting-station shown in Fig. 7, the source of electricity for the production of circular or elliptical oscillations is constituted by a two-phase alternator 4. When the interrupters 5' 5" (which are coupled and therefore acted upon simultaneously) are closed, the two currents furnished by the alternator pass the primary circuits 6' 6" of two induction-coils. With each of the secondaries 7' and 7" of said coils and forming with them two closed circuits are disposed in series the capacities 18', 18" and the primary windings 35' 35", which latter constitute the primaries of the two oscillation-transformers; the discharge-conductors 1' 2' and 1" 2" are disposed in derivation on the secondaries 7' and 7". The oscillations produced in these circuits 7'.18'.35' and 7".18".35", which are electrically identical, are transmitted by induction to the two secondary windings 36' 36" of the two oscillation-transformers, the secondary circuits of said oscillation-transformers being connected at one terminal ($a$ and $b$ respectively) to each of the two insulated systems of aerials and grounded at 8 by their other terminal. The propagation of the electromagnetic waves in the desired direction will also be facilitated by using conductors laid upon the earth or sheets of insulating substance suitably disposed.

A further advantage may be obtained in my present system of transmissions by using the oscillator shown in Fig. 8, constituted by the discharge-conductors 1, 2, 13, this latter having angular form of or about ninety degrees and the others being disposed on the axis of the two branches of 13, which is grounded. The two oscillations are here already obtained in the oscillator itself with an angular direction one to another equal to that which in the above-described arrangements takes place only on the aerial conductors, the action of these aerial conductors is thereby reinforced.

Having thus described my invention, what I claim as new therein, and desire to secure by Letters Patent, is—

1. In an apparatus for transmitting electrical energy, the combination with a suitable main electric circuit, a source of electric current and a circuit-breaker therein; of a discharge-circuit in inductive relation to the main circuit, discharge-conductors therein and a branch circuit therefrom, means in said branch circuit to throw the current therein out of phase with that in the discharge-circuit, and grounded aerials in inductive relation to said branch circuit.

2. In an apparatus for transmitting electrical energy, the combination with a suitable main electric circuit, a source of electric current therein and means to make and break said circuit; of a discharge-circuit in inductive relation to the main circuit carrying induced currents of higher potential than those in the main circuit, discharge-terminals in said circuit, a derived or branch circuit from said discharge-circuit, a capacity in said circuit and grounded aerials at an angle to each other and in inductive relation to said derived circuit.

3. In an apparatus for transmitting electrical energy, the combination with a suitable main electric circuit, a source of electric current therein and means to make and break the circuit; of a discharge-circuit, discharge-conductors therein to produce oscillations at an angle to one another, a circuit forming a branch of the discharge-circuit, a phase-displacing device therein, grounded aerials placed at an angle with one another and in inductive relation to the branch circuit.

4. In an apparatus for transmitting electrical energy, the combination with a suitable main electric circuit, a source of electric current therein and means to make and break said circuit; of as many discharge-circuits in inductive relation to the main circuit as there are phases in the current transmitted by the source of current, terminals in said discharge-circuits, and a branch or derived circuit connected to each of the discharge-circuits and a grounded aerial in inductive relation to said branch circuit.

5. In an apparatus for transmitting electrical energy, the combination with a suitable main electric circuit, a source of electric current therein and means for making and breaking said circuit; of as many discharge-circuits as there are phases in the current furnished by said source, discharge-terminals in each of said discharge-circuits, a branch or derived circuit from each discharge-circuit, means to change the phase relation of the currents in the discharge and branch circuits, and grounded aerials in inductive relation to said branch circuit.

6. In an apparatus for transmitting electrical energy, the combination with a suitable main electric circuit, a source of electric current for said circuit and means to make and break said circuit; of a discharge-circuit in inductive relation to the main circuit having a branch, and means in said branch to change the phase relations of the currents in the discharge-circuit and branch circuit, grounded aerials at an angle to each other and in inductive relation to the branch circuit, and screens positioned in inductive relation to the aerials.

7. In an apparatus for transmitting electric energy, the combination with a suitable main electric circuit, a source of electric current for said circuit and means to make and break the circuit; of a discharge-circuit in inductive relation to the main circuit, a branch circuit from the discharge-circuit, aerials in inductive relation to the branch circuit, means in the branch circuit to change the phase relation of the currents delivered to one of the aerials.

8. In an apparatus for transmitting electric energy, the combination with a main electric circuit, a source of electrical energy therefor and means to make and break said circuit; of a discharge-circuit in inductive relation to the main circuit having a branch, a capacity in said branch, grounded aerials of grid form in inductive relation to said branch and grounded or insulated screens placed near said grids, substantially as described.

9. In an apparatus for transmitting electric energy, the combination with a main electric circuit, a source of electric energy therefor, a primary coil of an induction apparatus therein and means to make and break the circuit; of a discharge-circuit containing the secondary coil of said apparatus, and discharge-terminals, a branch circuit from the discharge-circuit, primary coils and means to produce capacity in said circuit, aerials, a secondary coil connected to one of them and grounded and in inductive relation to one of the primary coils of the branch circuit, and means in inductive relation to the other coil of the branch circuit and to the other aerial to induce currents therein out of phase with those in the first-mentioned aerial, substantially as described.

10. In an apparatus for transmitting electric energy, the combination with a source of electric current; of means to produce oscillatory discharges differing in phase, grounded aerials at an angle to each other and screens symmetrically placed in relation to the aerials.

11. In an apparatus for transmitting electric energy, the combination with a source of electric current; of means to produce oscillatory discharge at an angle and means to change the phase of the discharge, and aerials having such angular relation to each other and to the phase difference as to produce circularly or elliptically polarized waves.

12. In an apparatus for transmitting electric energy, the combination with a source of electric current; of means to produce oscillatory discharges, the directions of discharge making an angle with each other and actuated by the current, grounded aerials inductively influenced by said discharges and in such angular relation to the phase difference as to produce circularly or elliptically polarized waves.

13. In an apparatus for transmitting electric waves, two discharge-terminals and a grounded angular discharge-terminal, said discharge-terminals placed opposite to and in line with the legs of said angular terminal.

In testimony whereof I have signed my name to this specification in the presence of two subscribing witnesses.

ALESSANDRO ARTOM.

Witnesses:
GOTTARDO C. PIRONI, [L. S.]
EUGENIO G. B. CASETTOI. [L. S.]